Patented July 13, 1937

2,086,717

UNITED STATES PATENT OFFICE 2,086,717

PREPARATION OF FERTILIZERS

Walter H. Kniskern, Petersburg, Va., and Frank J. De Rewal, Camillus, N. Y., assignors, by mesne assignments, to The Solvay Process Company, New York, N. Y., a corporation of New York No Drawing. Application June 7, 1933,
Serial No. 674,692

8 Claims. (Cl. 71—43)

This invention relates to an ammoniating and fungicidal and insecticidal reagent for the treatment of acidic fertilizer materials and to processes for the production of fertilizers employing said reagent. More particularly, this invention relates to ammoniacal solutions of soluble sulfides for use in the treatment of acidic fertilizers, for example, superphosphates, to processes for the production of fertilizers by the treatment of acidic fertilizer materials with said solutions and to the fertilizers obtained employing the processes of the invention.

Fertilizer compositions have heretofore been prepared by treating an acidic material, such as for example a superphosphate (superphosphate or triple superphosphate), with ammonia thereby neutralizing the free acid in the superphosphate and adding to it a desirable proportion of nitrogen.

It is an object of this invention to provide a novel composition of matter combining both fertilizing and insecticidal and fungicidal properties in a desirable degree. It is a further object of this invention to provide a new composition of matter for the treatment of acidic fertilizer materials whereby nitrogen which is available as a plant food may be introduced into said materials together with a desired proportion of a sulfide which acts as an insecticide and fungicide, thereby forming mixed fertilizers which are stable with respect to their content of the various constituents. It is also an object of this invention to provide a novel process for the preparation of mixed fertilizers employing ammoniacal solutions of sulfides for the treatment of acidic fertilizer materials. Other objects of the invention will in part be obvious and will in part appear hereinafter.

In preparing a fertilizer in accordance with the process of this invention, an acidic fertilizing material, such as for example superphosphate, is treated with an ammoniacal solution of a sulfide such as potassium sulfide, potassium acid sulfide, sodium or ammonium sulfide and the like. The ammoniacal solutions may also contain more or less free sulfur in addition to the sulfur combined in the form of a sulfide. In thus treating superphosphate with an ammoniacal solution of a sulfide, it is preferred to employ the solution in amount sufficient to neutralize the free acidity of the superphosphate and in addition to react with water soluble $P_2O_5$ in the superphosphate to form citrate soluble $P_2O_5$. It is also preferred to employ an ammoniacal solution containing potassium sulfide or potassium acid sulfide since the content of potassium thus introduced into the fertilizer mixture is advantageous in the preparation of complete mixed fertilizers.

Various methods of preparing the solutions of sulfides in ammoniacal liquids in accordance with this invention may be employed. Anhydrous solutions may be obtained by treating dry solid potassium sulfide or potassium acid sulfide with anhydrous ammonia. If desired, hydrogen sulfide may be dissolved in the ammonia or in the solution obtained by treating the ammonia with potassium sulfide or potassium acid sulfide. For the preparation of aqueous solutions, water may be added to anhydrous solutions prepared by the methods described above or the water may be introduced into the solution by utilizing for the preparation of the solutions, slurries or hydrates of the sulfide or aqua ammonia. In general, compositions may be prepared by admixing the ingredients (potassium sulfide or potassium acid sulfide with or without hydrogen sulfide, ammonia and, if desired, water), any one or more of which ingredients may be chemically combined or admixed with one or more of the other ingredients prior to compounding to form the ammoniacal solution of the sulfide.

It is frequently also desirable to prepare the solutions by leaching crude materials containing potassium sulfide or potassium acid sulfide with anhydrous or aqua ammonia and separating the resulting solution from insoluble constituents. In accordance with this method, the crude product obtained by reducing polyhalite (a material corresponding substantially to the composition $K_2SO_4.MgSO_4.2CaSO_4.2H_2O$) may be leached with anhydrous or aqua ammonia to yield ammoniacal solutions of sulfides.

The following examples of the ammoniacal solutions of sulfides and of methods for the preparation of fertilizers employing such solutions are illustrative of the invention but the invention is not limited to the specific details of these examples:

*Example I.*—A crude potassium sulfide containing about 45% $K_2S$, 30% free sulfur, and the remainder of the material principally consisting of potassium sulfate and sulfite and water, is added to and agitated with anhydrous liquid ammonia in amount sufficient to substantially saturate the ammonia with potassium sulfide at a temperature of about 25° C. The solution thus obtained may be separated from any undissolved materials and contains about 11% $K_2S$, about 1½% $(NH_4)_2S$, about 80% $NH_3$ and about 7½% uncombined sulfur. It contains about .15 part of sulfide ($K_2S$ and $(NH_4)_2S$) to every 1 part $NH_3$.

A solution may be prepared from potassium acid sulfide in a like manner to that described above for the preparation of solutions from potassium sulfide. Thus, by reacting the potassium sulfide described above with sufficient hydrogen sulfide to convert the $K_2S$ to KHS and then adding the resulting potassium acid sulfide to anhydrous liquid ammonia in the manner described, a solution containing about 7% $K_2S$, 12% $(NH_4)_2S$, 76½% $NH_3$ and 4½% free sulfur may be prepared. It contains about .25 part of sulfide ($K_2S$ and $(NH_4)_2S$) to every 1 part $NH_3$.

By employing aqua ammonia containing 50% $NH_3$ and 50% water in place of the anhydrous liquid ammonia used in the above methods for dissolving the potassium sulfide or potassium acid sulfide, solutions of the following compositions may be prepared:

|   | $K_2S$ | $(NH_4)_2S$ | $NH_3$ | $H_2O$ | Free sulfur |
|---|---|---|---|---|---|
|   | Percent | Percent | Percent | Percent | Percent |
| a | 12 | 1.3 | 39.4 | 39.2 | 8.1 |
| b | 9.4 | 7.9 | 37.3 | 40.7 | 4.7 |

Solutions a and b of the above table are prepared by dissolving potassium sulfide and potassium acid sulfide, respectively, in the aqua ammonia. Solution a contains about .34 part sulfide and solution b contains about .46 part sulfide ($K_2S$ and $(NH_4)_2S$) to every 1 part $NH_3$.

Example II.—Polyhalite is reduced by means of hydrogen or natural gas and the residue containing potassium sulfide and potassium acid sulfide is leached with anhydrous liquid ammonia or with aqua ammonia to yield solutions containing potassium sulfides suitable for addition to acidic fertilizer materials.

Example III.—A solution of potassium sulfide in anhydrous liquid ammonia prepared in accordance with the method first described in Example I is utilized for the preparation of a fertilizer mixture by spraying about 51 parts of the solution onto a mixture of the following materials:

| | Parts |
|---|---|
| Superphosphate | about 890 |
| Muriate of potash (50% $K_2O$) | do 141 |
| Ammonium sulfate | do 228 |
| Inert filler (sand) | do 635 |

The resulting mixture contains about 4% N, 8% $P_2O_5$ and 4% $K_2O$ and in addition a desirable content of sulfides.

Example IV.—About 107 parts of a solution prepared by adding potassium acid sulfide to 50% aqua ammonia (solution b of Example I), is sprayed onto and incorporated with a mixture of the following ingredients:

| | Parts |
|---|---|
| Superphosphate | about 890 |
| Muriate of potash (50% $K_2O$) | do 148 |
| Ammonium sulfate | do 218 |
| Inert filler (sand) | do 637 |

The resulting mixture, which is in good physical condition and stable with respect to its content of the several ingredients, contains about 4% N, 8% $P_2O_5$ and 4% $K_2O$.

Potassium sulfide as the solid is a highly hygroscopic material. Its transportation and storage as a solid, therefore, presents practical disadvantages which are overcome by employing the ammoniacal solutions of this invention as a means for transporting and storing this material. The extraction of potassium sulfide from reduced polyhalite by means of liquid anhydrous ammonia or aqua ammonia affords a particularly advantageous method for the recovery from polyhalite of valuable fertilizer ingredients in a convenient form for their transportation and storage as a liquid composition which may be directly used for the preparation of mixed fertilizers by addition to acidic materials.

Numerous changes and modifications in the particular compositions described above and in their use for the preparation of fertilizers may be made. Thus, ammoniacal solutions of soluble sulfides other than a potassium sulfide, for example, a sodium or ammonium sulfide, may be prepared and utilized in the manner disclosed above for solutions of potassium sulfide. Further, the ammoniacal solutions of sulfides may contain dissolved therein other salts such as, for example, ammonium nitrate and ammonium sulfate, sodium nitrate, ammonium chloride, urea, calcium nitrate or two or more of the foregoing materials.

We claim:

1. The process for preparing a fertilizer which comprises mixing a solid acidic fertilizer material with an ammoniacal solution of a sulfide containing uncombined ammonia in substantial excess of the amount of sulfide, said solution being employed in an amount such that the amount of uncombined ammonia is sufficient to neutralize the free acidity of the fertilizer material and to incorporate in the resulting product as sulfide substantially all of the sulfide originally in said ammoniacal solution.

2. The process for preparing a fertilizer which comprises mixing a superphosphate with an ammoniacal solution of a sulfide containing uncombined ammonia in substantial excess of the amount of sulfide, said solution being employed in an amount such that the amount of uncombined ammonia is sufficient to neutralize the free acidity of the superphosphate and to react with water soluble $P_2O_5$ in the superphosphate to form citrate soluble $P_2O_5$ and to incorporate in the resulting ammoniated superphosphate product as sulfide substantially all of the sulfide originally in said ammoniacal solution.

3. The process for preparing a fertilizer which comprises mixing a solid acidic fertilizer material with an ammoniacal solution of potassium sulfide, said solution containing uncombined ammonia in substantial excess of the amount of potassium sulfide, said solution being employed in an amount such that the amount of uncombined ammonia is sufficient to neutralize the free acidity of the fertilizer material and to incorporate in the resulting product as sulfide substantially all of the potassium sulfide originally in said ammoniacal solution.

4. The process for preparing a fertilizer which comprises mixing a superphosphate with an ammoniacal solution of potassium sulfide, said solution being substantially saturated with said sulfide and containing an amount of uncombined ammonia in substantial excess of the amount of sulfide and being employed in an amount so that the amount of uncombined ammonia is sufficient to neutralize the free acidity of the superphosphate and to react with water soluble $P_2O_5$ in the superphosphate to form citrate soluble $P_2O_5$, whereby the superphosphate is ammoniated and the potassium sulfide is incorporated therein.

5. The process for preparing a fertilizer which comprises mixing a superphosphate with a saturated solution of potassium sulfide in an ammoniacal liquid containing at least 50% uncombined ammonia, said solution being employed in an amount so that the amount of uncombined ammonia is sufficient to neutralize the free acidity of the superphosphate and to react with water soluble $P_2O_5$ in the superphosphate to form citrate soluble $P_2O_5$, whereby the superphosphate is ammoniated and the potassium sulfide is incorporated therein.

6. The process for preparing a fertilizer which comprises mixing a superphosphate with a solution of potassium sulfide in anhydrous liquid ammonia substantially saturated with potassium sulfide at a temperature of about 25° C., said solution being employed in an amount so that the amount of uncombined ammonia is sufficient to neutralize the free acidity of the superphosphate and to react with water soluble $P_2O_5$ in the superphosphate to form citrate soluble $P_2O_5$, whereby the superphosphate is ammoniated and the potassium sulfide is incorporated therein.

7. The process for preparing a fertilizer which comprises mixing a superphosphate with a solution of potassium sulfide in about 50% aqua ammonia, said solution being substantially saturated with potassium sulfide at a temperature of about 25° C., said solution being employed in an amount so that the amount of uncombined ammonia is sufficient to neutralize the free acidity of the superphosphate and to react with water soluble $P_2O_5$ in the superphosphate to form citrate soluble $P_2O_5$, whereby the superphosphate is ammoniated and the potassium sulfide is incorporated therein.

8. The process for producing a fertilizer which comprises mixing a solution of potassium sulfide in anhydrous liquid ammonia containing about 11% $K_2S$ with a material containing superphosphate in the proportions of about 51 parts of said solution for every 890 parts of superphosphate.

WALTER H. KNISKERN.
FRANK J. DE REWAL.